(12) United States Patent
Kao et al.

(10) Patent No.: US 8,319,479 B2
(45) Date of Patent: Nov. 27, 2012

(54) METHOD OF ESTIMATING BATTERY RECHARGE TIME AND RELATED DEVICE

(75) Inventors: Chin-Hsing Kao, Taoyuan County (TW); Chun-Ming Chen, Hsinchu (TW); Tien-Chung Tso, Hsinchu County (TW)

(73) Assignee: eMemory Technology Inc., Hsinchu Science Park, Hsin-Chu (TW)

( * ) Notice: Subject to any disclaimer, the term of this patent is extended or adjusted under 35 U.S.C. 154(b) by 483 days.

(21) Appl. No.: 12/729,245

(22) Filed: Mar. 23, 2010

(65) Prior Publication Data

US 2011/0234173 A1    Sep. 29, 2011

(51) Int. Cl.
*H02J 7/16* (2006.01)
*H01H 47/00* (2006.01)
*G01N 27/416* (2006.01)

(52) U.S. Cl. ........ 320/157; 320/132; 320/133; 320/150; 320/152; 320/160; 307/116; 307/125; 307/130; 307/131; 324/426

(58) Field of Classification Search .................... 320/157
See application file for complete search history.

(56) References Cited

U.S. PATENT DOCUMENTS

| | | | | |
|---|---|---|---|---|
| 5,325,039 A | * | 6/1994 | Ninomiya | ..................... 320/157 |
| 5,565,759 A | | 10/1996 | Dunstan | |
| 6,100,669 A | * | 8/2000 | Tokita | ........................... 320/149 |
| 6,204,634 B1 | | 3/2001 | Zimmerman | |
| 6,534,954 B1 | * | 3/2003 | Plett | .............................. 320/132 |
| 6,829,562 B2 | * | 12/2004 | Sarfert | .......................... 702/182 |
| 7,615,969 B2 | * | 11/2009 | Meng et al. | ................... 320/150 |
| 7,844,840 B2 | * | 11/2010 | McShane et al. | ............. 713/300 |
| 2004/0169495 A1 | * | 9/2004 | Yumoto et al. | ................ 320/132 |
| 2005/0046388 A1 | * | 3/2005 | Tate et al. | ..................... 320/132 |
| 2005/0194936 A1 | * | 9/2005 | Cho | ............................... 320/132 |
| 2008/0122399 A1 | | 5/2008 | Nishino | |

OTHER PUBLICATIONS

SBS 1.1-Compliant Gas Gauge Enabled With Impedance Track TM Technology for Use With the bq29330, Mar. 2009.
SBS 1.1-Compliant Gas Gauge and Protection Enabled With Impedance Track TM, Mar. 2009.
2-, 3-, and 4-Cell Lithium-Ion or Lithium-Polymer Battery Protection AFE, Mar. 2009.

* cited by examiner

*Primary Examiner* — Yalkew Fantu
(74) *Attorney, Agent, or Firm* — Winston Hsu; Scott Margo

(57) ABSTRACT

A smart battery device includes an adapter, a switch electrically connected to the adapter, a battery pack electrically connected the switch, a sense resistor electrically connected to the battery pack and the adapter, an analog preprocessing circuit electrically connected to the battery pack and the sense resistor for digitizing analog signals measured at the battery pack and the sense resistor to form digital signals, and an adaptive control circuit electrically connected to the analog preprocessing circuit for receiving the digital signals, and electrically connected to the switch for selectively turning the switch on or off according to the digital signals.

19 Claims, 4 Drawing Sheets

METHOD OF ESTIMATING BATTERY RECHARGE TIME AND RELATED DEVICE

BACKGROUND OF THE INVENTION

1. Field of the Invention

The present invention relates to battery chargers, and more particularly to a method of estimating recharging time of a rechargeable battery and a related charging device.

2. Description of the Prior Art

Batteries are a class of power supplies that are self-contained, and usually portable. Batteries use electrochemical reactions to generate electricity from a variety of chemicals. Rechargeable batteries are batteries whose electrochemical reaction can be reversed electrically to restore the rechargeable battery to a state wherein the electrochemical reaction can be performed again to generate electricity. Typical rechargeable batteries may be recharged for a number of cycles in the hundreds to thousands. Rechargeable batteries are employed in a wide variety of electronic consumer products, especially portable electronic devices, such as cellular phones, multimedia devices, and notebook or netbook computers.

To take advantage of processing and display functions of the portable electronic devices, a Smart Battery System (SBS) has been proposed that allows operating systems to communicate with the rechargeable battery through a data bus, such as a System Management Bus (SMBus). The operating system may receive SBS parameters, such as Average Time To Full (ATTF), from the rechargeable battery, and may display the parameters in a graphical user interface to inform a user of the portable electronic device of battery status. The operating system may also control power management functions of the rechargeable battery through the SMBus.

Please refer to FIG. 1, which is a block diagram of a battery device 10 according to the prior art. The battery device 10 may be installed in a housing, and may be electrically connected to a notebook computer for powering internal circuits and electrical devices, such as a hard disk drive and a liquid crystal display (LCD), of the notebook computer. The battery device 10 may comprise a plurality of battery cells 100, a battery management integrated circuit (IC) 110, and a notebook charger connector 120 installed in the housing. The notebook charger connector 120 may be electrically connected to a positive terminal (+) and a negative terminal (−) of the plurality of battery cells 100. The notebook charger connector 120 may be electrically connected to the positive terminal of the plurality of battery cells 100 through a fuse 130 and a switch 140, and may be electrically connected to the negative terminal of the plurality of battery cells 100 through a current sensing resistor 150. Gas gauge and status messages, as well as control signals, may be transferred between the battery management IC 110 and the notebook charger connector 120 through a System Management Bus (SMBus) 160. The plurality of battery cells 100 may provide direct current (DC) power to the notebook computer at a voltage level ranging from 16 Volts to 18 Volts, though higher or lower voltages may also provided by the plurality of battery cells 100 for powering the notebook computer. The plurality of battery cells 100 may be arranged in any combination of series and parallel connections. For example, as shown in FIG. 1, the plurality of battery cells 100 may comprise four individual battery cells arranged in series. The battery management IC 110 may control the fuse 130 and the switch 140 for preventing overcurrent and/or overvoltage events from damaging the notebook computer. The switch 140 may be a transistor having a control terminal electrically connected to the battery management IC 110. The battery management IC 110 may also be electrically connected to first and second terminals of the current sensing resistor 150 for detecting the overcurrent event. The battery management IC 110 may have a terminal electrically connected to a thermistor 190 for regulating output of the DC power in response to temperature variations detected through the thermistor 190. The battery management IC 110 may also control a plurality of light-emitting diodes (LEDs) 195 for providing battery status messages to a user of the notebook computer. The plurality of LEDs 195 may be visible through the housing.

While the SBS provides greater flow of information between the operating system and the rechargeable battery, the user may have a difficult time accurately predicting remaining time to full charge from the ATTF parameter. ATTF is typically calculated as (Full Charge Capacity−Remaining Capacity)/(Average Current). However, this method of calculating ATTF is inaccurate. Further, the user is not provided with useful data for informing the adoption of a recharging settings strategy. Finally, the recharging settings cannot be optimized automatically.

SUMMARY OF THE INVENTION

According to an embodiment, a smart battery device comprises an adapter, a switch, a battery pack, a sense resistor, an analog preprocessing circuit, and an adaptive control circuit. The switch has an output terminal electrically connected to a first terminal of the adapter. The battery pack has a first terminal electrically connected to an input terminal of the switch and comprises a plurality of battery cells. The sense resistor has a first terminal electrically connected to a second terminal of the battery pack and a second terminal electrically connected to a second terminal of the adapter. The analog preprocessing circuit is electrically connected to the battery pack and the sense resistor for digitizing analog signals measured at the battery pack and the sense resistor to form digital signals. The adaptive control circuit has an input terminal electrically connected to an output terminal of the analog preprocessing circuit for receiving the digital signals, and an output terminal electrically connected to a control terminal of the switch for selectively turning the switch on or off according to the digital signals.

According to an embodiment, a method of charging a battery pack of a smart battery device comprises a microprocessor of the smart battery device receiving a preferred charging condition from user input, the microprocessor retrieving parameters corresponding to the preferred charging condition from a battery characteristic look-up table stored in a memory circuit of the smart battery device, the microprocessor enabling charging of the battery pack according to the parameters, the microprocessor computing a final state of charge and approximating an average-time-to-full (ATTF), the microprocessor updating a state of charge, the microprocessor incrementing a counter of a timer circuit of the smart battery device when the state of charge is less than the final state of charge, the microprocessor updating the ATTF in the memory circuit, and the microprocessor disabling charging of the battery pack when the state of charge is greater than or equal to the final state of charge.

According to an embodiment, a method of approximating average-time-to-full (ATTF) in a smart battery device comprises calculating a transition point from constant current charging to constant voltage charging, obtaining state of charge at the transition point, calculating constant current charge and constant voltage charge according to the transition point, calculating constant current charge time according to the constant current charge, approximating constant voltage charge time according to the constant voltage charge, and obtaining ATTF as sum of the constant current charge time and the constant voltage charge time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
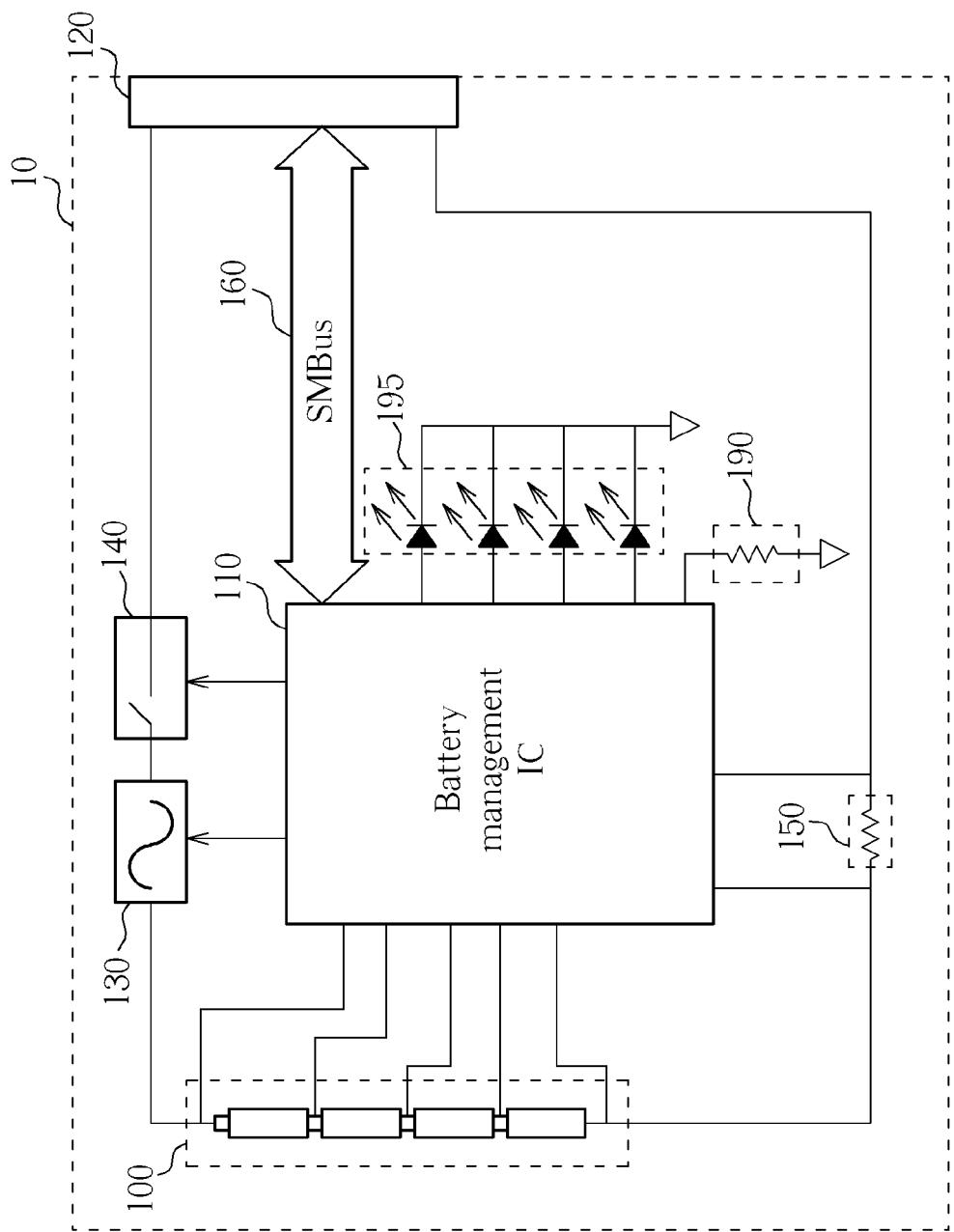
FIG. 1 is a block diagram of a battery device according to the prior art.
Figure 2:
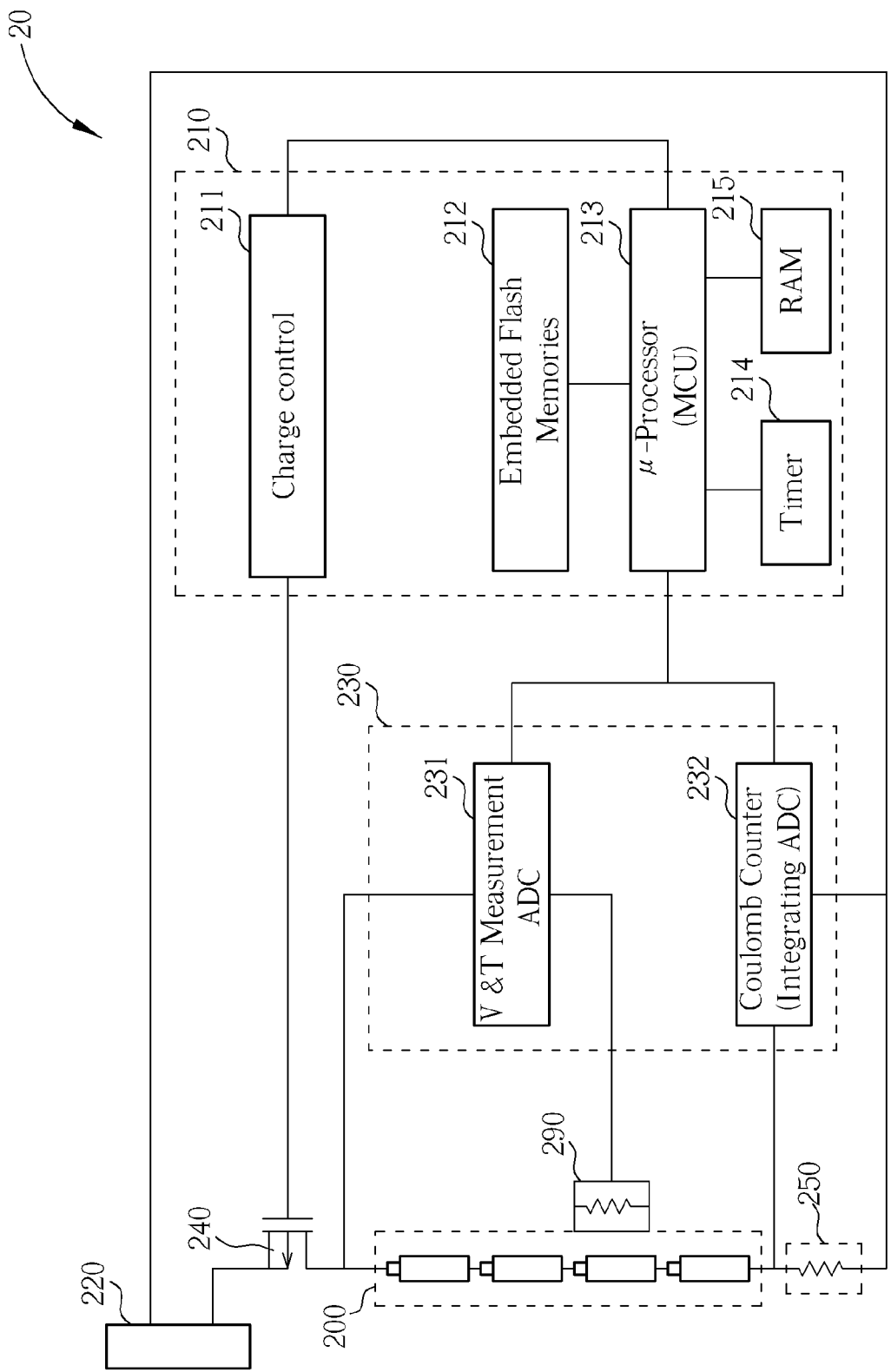
FIG. 2 is a block diagram of a smart battery device according to an embodiment of the present invention.

Please refer to FIG. 2, which is a block diagram of a smart battery device 20 according to an embodiment of the present invention. The smart battery device 20 may comprise a battery pack 200, an adaptive control circuit 210, an external adapter 220, an analog preprocessing circuit 230, a switch 240, a sense resistor 250, and a thermistor 290. The adaptive control circuit 210 may comprise a microprocessor 213, embedded flash memory 212, a timer 214, random access memory (RAM) 215, and a charge control circuit 211. The analog preprocessing circuit 230 may comprise a voltage and temperature measurement analog-to-digital converter (ADC) 231, and a Coulomb counter 232. The Coulomb counter 232 may be considered an integrating ADC.

The battery pack 200 may comprise a plurality of battery cells. The battery cells may be arranged in any combination of serial and parallel. The adaptive control circuit 210 may be utilized for controlling on and off states of the switch 240 for selectively connecting or disconnecting the battery pack 200 to or from an external electronic device through the external adapter 220. The microprocessor 213 may send a signal to the charge control circuit 211 for turning the switch 240 on or off according to the signal received from the microprocessor 213. The voltage and temperature measurement ADC 231 may have a first input electrically connected to the thermistor 290 for receiving a temperature signal related to temperature of the battery pack 200, and may have a second input electrically connected to the battery pack 200 for receiving a voltage level of the battery pack 200. The voltage and temperature measurement ADC 231 may convert the voltage level and the temperature signal into a digital voltage signal and a digital temperature signal, respectively, both of which may be sent to the microprocessor 213. The Coulomb counter 232 may have a first input electrically connected to a first end of the sense resistor 250, and a second input electrically connected to a second end of the sense resistor 250. A voltage drop across the sense resistor 250 may be detected by the Coulomb counter 232, integrated over time, and digitized into a battery charge signal sent to the microprocessor 213 through an output of the Coulomb counter 232 electrically connected to the microprocessor 213. The embedded flash memory 212 may store charging characteristics, use history, firmware, and a database. The use history may include aging information.

Figure 3:
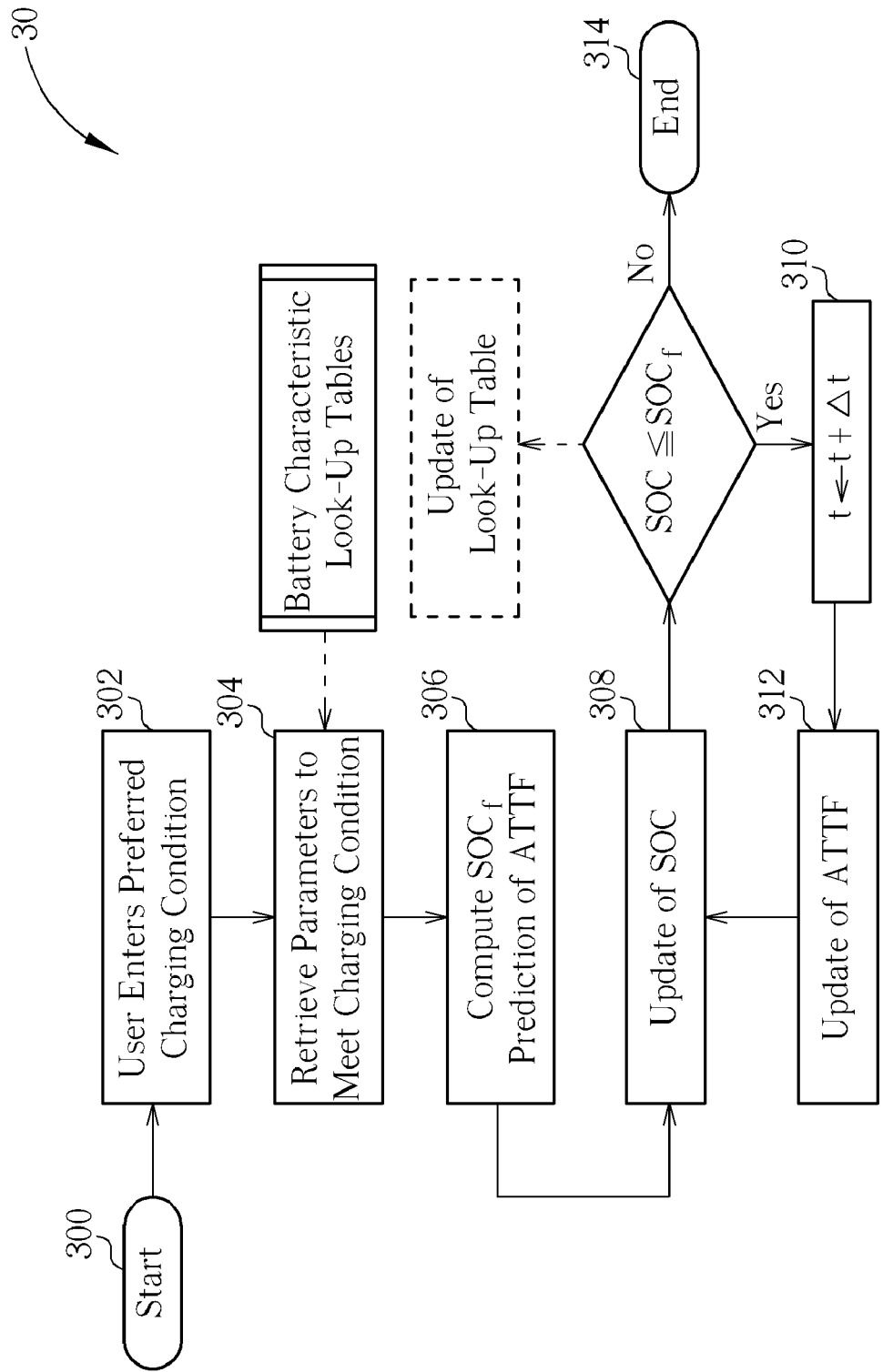
FIG. 3 is a flowchart of a process for performing battery recharge time estimation according to an embodiment of the present invention.

Please refer to FIG. 3, which is a flowchart of a process 30 for performing battery recharge time estimation according to an embodiment of the present invention. The process 30 may be performed by the smart battery device 20, and may comprise the following steps:

Step 300: Start;

Step 302: User enters preferred charging condition;

Step 304: Microprocessor retrieves parameters corresponding to charging condition from battery characteristic look-up tables;

Step 306: Microprocessor computes $SOC_f$ and predicts ATTF;

Step 308: Microprocessor updates SOC; if $SOC \leqq SOC_f$, go to Step 310; else, go to Step 314;

Step 310: Microprocessor increments a counter t of timer circuit by a count increment $\Delta t$;

Step 312: Microprocessor updates ATTF in memory; go to Step 308; and

Step 314: End.

In Step 302, the user may enter a preferred charging condition, or profile, such as rapid charging or full charging. The preferred charging condition may be a preferred charging time or a preferred charge level. Based on the charging condition provided by the user, the microprocessor may retrieve parameters corresponding to the charging condition from the battery characteristic look-up tables stored in the embedded flash memory 212 (Step 304). The look-up tables may include parameters such as the charge current $I_{Chg}$, which may affect charge time. Based on the charging condition, the microprocessor may compute a final state of charge $SOC_f$, as well as the ATTF (Step 306). The final state of charge $SOC_f$ may be affected by the preferred charge level, and may also be affected by battery use history information and/or battery aging information stored in the embedded flash memory 212. As charging is performed on the battery pack 200, the microprocessor may update state of charge SOC (Step 308). If the state of charge SOC is less than the final state of charge $SOC_f$, the battery pack 200 is not charged to the preferred charge level, and the microprocessor increments a counter t by the count increment $\Delta t$ (Step 310). The microprocessor then updates the ATTF in the embedded flash memory 212 (Step 312), and returns to Step 308 to update the state of charge SOC. Steps 308 to 312 may be repeated until the state of charge SOC is greater than or equal to the final state of charge $SOC_f$, at which point the process 30 may end (Step 314). In the above, a plurality of discrete points of the state of charge may be established, and the microprocessor may update the battery characteristic look-up table during charging each time the state of charge passes one of the plurality of discrete points.

Figure 4:
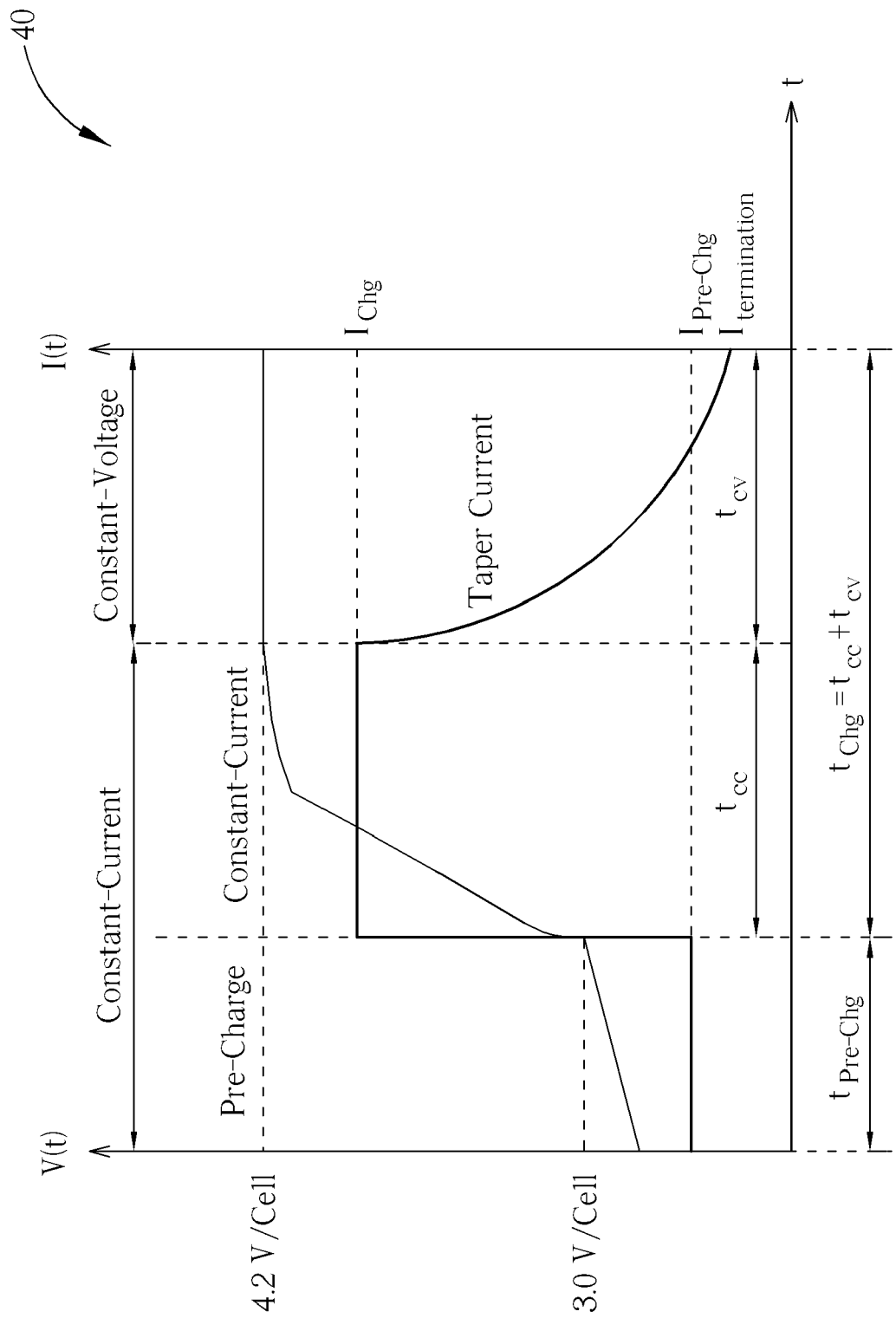
FIG. 4 shows a graph illustrating a charge profile.

Please refer to FIG. 4, which shows a graph 40 illustrating a charge profile. When charging the battery pack 200, a pre-charging current $I_{Pre-Chg}$ may be applied to the battery pack 200 until voltage of the battery pack 200 reaches a pre-charge voltage, e.g. 3.0 Volts/cell. Time for performing pre-charging may be represented as a pre-charging time $t_{Pre-Chg}$. Once the pre-charge voltage is reached, a charge current $I_{Chg}$ may be applied to the battery pack 200 until a charged voltage, e.g. 4.2 Volts/cell, is reached. The charged voltage may be considered an upper limit voltage $V_{lim}$ for safely charging the battery pack 200 without damaging the battery pack 200. The pre-charging current $I_{Pre-Chg}$ and the charge current $I_{Chg}$ may both be constant currents. Time for the battery pack 200 to go from the pre-charge voltage to the charged voltage may be represented as a constant current time $t_{cc}$. Once the charged voltage is reached, a taper current may be applied to the battery pack 200, keeping the battery pack 200 at the charged voltage until the taper current reaches a termination current $I_{termination}$. The termination current $I_{termination}$ may be lower than the pre-charging current $I_{Pre-Chg}$. Time from reaching the charged voltage to reaching the termination current $I_{termination}$ may be represented as a constant voltage time $t_{cv}$. Sum of the constant current time $t_{cc}$ and the constant voltage time $t_{cv}$ may be a charge time $t_{Chg}$. The charged voltage, the charge current $I_{Chg}$, and the termination current $I_{termination}$ may all be user-defined parameters, and may be stored in the embedded flash memory 212.

To predict the ATTF (Step 306), constant current time $t_{cc}$ and constant voltage time $t_{cv}$ may be predicted. The sum of the constant current time $t_{cc}$ and the constant voltage time $t_{cv}$ may then represent the ATTF. The constant current time $t_{cc}$ may be predicted by determining amount of charge $Q_{Chg}$ that may be stored in the battery pack 200 based on a change point, or transition point, from constant current charging to constant voltage charging. The change point may be a charging percentage, e.g. 75% or 80%, corresponding to how fully the battery pack 200 is charged before switching to constant voltage charging. Based on the charging percentage, the amount of charge $Q_{Chg}$ to be stored during constant current charging may be determined. The constant current time $t_{cc}$ may then be determined by dividing the amount of charge $Q_{Chg}$ stored during constant current charging by the charge current $I_{Chg}$. The constant voltage time $t_{cv}$ may be approximated by predicting constant voltage current $I_{cv}$ at each interval i utilized for providing an amount of charge $\Delta Q$. Accuracy of the approximation may be increased by increasing number of intervals i utilized in predicting the constant voltage time $t_{cv}$. To determine the constant voltage current $(I_{cv})_i$ for each interval i, an open circuit voltage $(OCV)_i$ and an internal resistance $(R_m)_i$ of the battery pack 200 may be utilized. The open circuit voltage $(OCV)_i$ may be a predetermined parameter stored in the embedded flash memory 212. The constant voltage current $(I_{cv})_i$ may be calculated by:

$$(I_{CV})_i = \frac{V_{lim} - (OCV)_i}{(R_m)_i}.$$

To determine interval constant voltage time $(\Delta t_{cv})_i$ for each interval i, the amount of charge $\Delta Q$ may be divided by the constant voltage current $(I_{cv})_i$. Then, the constant voltage time $t_{cv}$ may be calculated as:

$$t_{CV} = \sum_i (\Delta t_{CV})_i$$

As mentioned above, accuracy of the approximation may be increased by increasing number of intervals i utilized in predicting the constant voltage time $t_{cv}$. The approximation may be obtained iteratively, utilizing an increasing number of intervals i, until the following condition is met:

$$|t_{CV_j} - t_{CV_{j-1}}| < \text{threshold}$$

where j may represent number of iterations, and threshold may be a predetermined time threshold. For example, threshold may be one minute, so that if the constant voltage time $t_{CV_{j-1}}$ approximated in one iteration is different from the constant voltage time $t_{cv_j}$ approximated in an immediately following iteration by less than one minute, the ATTF calculated in the immediately following iteration may be utilized.

By approximating the ATTF using the method and device described above, the user is provided with a more accurate estimate of the ATTF. The user is also provided a basis for determining what kind of charging configuration to use. And, the charging settings may be optimized for time or fullness. These benefits make the method and related device described above more user-friendly.

Those skilled in the art will readily observe that numerous modifications and alterations of the device and method may be made while retaining the teachings of the invention.

What is claimed is:

1. A smart battery device comprising:
   an adapter;
   a switch having an output terminal electrically connected to a first terminal of the adapter;
   a battery pack having a first terminal electrically connected to an input terminal of the switch, the battery pack comprising a plurality of battery cells;
   a sense resistor having a first terminal electrically connected to a second terminal of the battery pack and a second terminal electrically connected to a second terminal of the adapter;
   an analog preprocessing circuit electrically connected to the battery pack and the sense resistor for digitizing analog signals measured at the battery pack and the sense resistor to form digital signals; and
   an adaptive control circuit having an input terminal electrically connected to an output terminal of the analog preprocessing circuit for receiving the digital signals, and an output terminal electrically connected to a control terminal of the switch for selectively turning the switch on or off according to the digital signals.

2. The smart battery device of claim 1, wherein the adaptive control circuit comprises:
   a memory circuit storing firmware, history data of the battery pack, charge characteristics, and a database;
   a charge control circuit electrically connected to the control terminal of the switch for selectively turning the switch on or off; and
   a microprocessor having a first input terminal electrically connected to the output terminal of the analog preprocessing circuit for receiving the digital signals, a second input terminal electrically connected to the memory circuit for accessing the firmware, history data, charge characteristics, and database stored in the memory circuit, and an output terminal electrically connected to the charge control circuit for controlling the charge control circuit to turn the switch on or off according to the digital signals;
   wherein the microprocessor receives a preferred charging condition from user input, retrieves parameters corresponding to the preferred charging condition from a battery characteristic look-up table stored in the memory circuit, enables charging of the battery pack according to the parameters, computes a final state of charge and approximates an average-time-to-full (ATTF), updates a state of charge, increments a counter of a timer circuit of the smart battery device when the state of charge is less than the final state of charge, updates the ATTF in the memory circuit, and disables charging of the battery pack when the state of charge is greater than or equal to the final state of charge.

3. The smart battery device of claim 2, wherein the analog preprocessing circuit comprises:
   a Coulomb counter electrically connected to the sense resistor for generating a battery charge signal of the digital signals according to a voltage drop across the sense resistor.

4. The smart battery device of claim 2, further comprising:
a thermistor electrically connected to the battery pack for detecting temperature of the battery pack to generate a temperature signal;
wherein the analog preprocessing circuit comprises:
a temperature measurement analog-to-digital converter (ADC) for digitizing the temperature signal to form a digital temperature signal of the digital signals.

5. The smart battery device of claim 2, wherein the analog preprocessing circuit comprises:
a voltage measurement analog-to-digital converter (ADC) electrically connected to the battery pack for digitizing a voltage signal of the battery pack to form a digital voltage signal of the digital signals.

6. The smart battery device of claim 2, wherein the microprocessor calculates state of charge (SOC) and average-time-to-full (ATTF) according to the digital signals.

7. The smart battery device of claim 2, wherein the microprocessor updates the battery characteristic look-up table during charging when the state of charge passes each discrete point of a plurality of discrete points.

8. The smart battery device of claim 2, wherein the microprocessor periodically updates the ATTF as stored charge of the battery pack increases.

9. A method of charging a battery pack of a smart battery device, the method comprising:
a microprocessor of the smart battery device receiving a preferred charging condition from user input;
the microprocessor retrieving parameters corresponding to the preferred charging condition from a battery characteristic look-up table stored in a memory circuit of the smart battery device;
the microprocessor enabling charging of the battery pack according to the parameters;
the microprocessor computing a final state of charge and approximating an average-time-to-full (ATTF);
the microprocessor updating a state of charge;
the microprocessor incrementing a counter of a timer circuit of the smart battery device when the state of charge is less than the final state of charge;
the microprocessor updating the ATTF in the memory circuit; and
the microprocessor disabling charging of the battery pack when the state of charge is greater than or equal to the final state of charge.

10. The method of claim 9, wherein the parameters comprise a preferred charge current.

11. The method of claim 9, wherein the parameters comprise a preferred charge time.

12. The method of claim 9, wherein the preferred charging condition is a default, rapid, or user-defined charging condition.

13. The method of claim 9, further comprising:
establishing a plurality of discrete points of the state of charge; and
the microprocessor updating the battery characteristic look-up table during charging when the state of charge passes each discrete point of the plurality of discrete points.

14. The method of claim 9, further comprising:
the microprocessor periodically updating the ATTF as stored charge of the battery pack increases.

15. A method of approximating average-time-to-full (ATTF) in a smart battery device, the method comprising:
calculating a transition point from constant current charging to constant voltage charging;
obtaining state of charge at the transition point;
calculating constant current charge and constant voltage charge according to the transition point;
calculating constant current charge time according to the constant current charge;
approximating constant voltage charge time according to the constant voltage charge; and
obtaining ATTF as sum of the constant current charge time and the constant voltage charge time.

16. The method of claim 15, wherein calculating the constant current charge time is calculating a quotient of the constant current charge and a charge current.

17. The method of claim 15, wherein approximating the constant voltage charge time according to the constant voltage charge comprises:
predicting a plurality of interval constant voltage currents corresponding to a plurality of charge intervals utilized for providing a predetermined amount of charge;
calculating a plurality of time intervals corresponding to the plurality of charge intervals according to the predetermined amount of charge and the plurality of interval constant voltage currents; and
summing the plurality of time intervals to obtain the constant voltage charge time.

18. The method of claim 17, wherein summing the plurality of time intervals to obtain the constant voltage charge time comprises:
increasing number of intervals until two consecutive calculations of the constant voltage charge time are different from each other by less than a predetermined threshold; and
selecting a latter of the two consecutive calculations as the constant voltage charge time.

19. The method of claim 15, wherein calculating the transition point from the constant current charging to the constant voltage charging is calculating the transition point from the constant current charging to the constant voltage charging according to an upper limit voltage.

* * * * *